(12) United States Patent
Daniels

(10) Patent No.: US 8,250,758 B2
(45) Date of Patent: Aug. 28, 2012

(54) INTERNAL YAW DRIVE EXCHANGE FOR A WIND TURBINE TOWER

(75) Inventor: Jeffrey M. Daniels, Delmar, NY (US)

(73) Assignee: General Electric Company, Schenectady, NY (US)

( * ) Notice: Subject to any disclaimer, the term of this patent is extended or adjusted under 35 U.S.C. 154(b) by 539 days.

(21) Appl. No.: 12/263,068

(22) Filed: Oct. 31, 2008

(65) Prior Publication Data

US 2010/0111665 A1 May 6, 2010

(51) Int. Cl.
*B23P 6/00* (2006.01)
(52) U.S. Cl. ...................................................... 29/889.1
(58) Field of Classification Search ................... 29/889.1; 414/814
See application file for complete search history.

(56) References Cited

U.S. PATENT DOCUMENTS 6,998,729 B1 * 2/2006 Wobben .......................... 290/54
2009/0267038 A1 * 10/2009 Teichert et al. ................ 254/335

* cited by examiner

*Primary Examiner* — David Bryant
*Assistant Examiner* — Moshe Wilensky
(74) *Attorney, Agent, or Firm* — Dority & Manning, P.A.

(57) ABSTRACT

A method for removing and replacing an article of wind turbine equipment, such as a yaw drive, internal to a nacelle of a wind turbine tower without use of an external windfarm site crane or external rigging on the wind tower. External rigging of wind turbine tower components may expose workers and the equipment inside the nacelle to outside weather and hazardous wind conditions. The yaw drive is internally rigged with an internal support crane within the nacelle to an internal winch capable of supporting the yaw drive during a lift to the base of the wind turbine tower.

16 Claims, 6 Drawing Sheets

INTERNAL YAW DRIVE EXCHANGE FOR A WIND TURBINE TOWER

BACKGROUND OF THE INVENTION

The invention relates generally to wind turbines and more specifically to a method for removing and replacing equipment in a wind turbine tower.

A wind turbine tower (WTT) is a large structure, sometimes extending to significant heights to accommodate large wind turbine rotor blades and to strategically place the rotor blades within a wind path. For example, a typical tower may have a height as high as about 100 meters (m). Such a tower may include multiple sections, often a bottom, a middle and a top section. The length and number of individual sections may vary according to the application and height of the structure. At various heights of the wind turbine tower, landings are provided. The landings include openings for ladders to allow operators and maintenance personnel to climb between landings. The landings may also include openings above each other to allow small components, tools and equipment to be lifted from a base of the wind turbine tower to a top landing of the tower.

Mounted on top of the support tower for wind turbines is a nacelle. The nacelle houses, or encloses, the equipment and components of the wind turbine and includes hubs for the wind turbine blades and the power train including the bearing, gearbox and electrical generator for the wind turbine.

FIG. 1 illustrates an exemplary wind turbine tower. Nacelle 102 is mounted atop a tall tower 104, only a portion of which is shown in FIG. 1. Wind turbine 100 also comprises a rotor 106 that includes one or more rotor blades 108 attached to a rotating hub 110. Although the wind turbine 100, as illustrated includes three rotor blades 108, there are no specific limits on the number of rotor blades.

FIG. 2 illustrates an exemplary internal arrangement for various components housed in nacelle 102. In some configurations, one or more microcontrollers within control panel 112 comprise a control system used for overall system monitoring and control. In some configurations, a variable blade pitch drive 114 is provided to control the pitch of blades 108 (not shown in FIG. 2) that drive hub 110 as a result of wind. In some configurations, the pitch angles of blades 108 are individually controlled by blade pitch drive 114. Hub 110 and blades 108 together comprise wind turbine rotor 106.

The drive train of the wind turbine includes a main rotor shaft 116 connected to hub 110 via main bearing 130. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 132. In some configurations, rotor torque is transmitted via coupling 122. A meteorological boom 128 provides information for a turbine control system, which may include wind direction and/or wind speed.

Yaw drive 124 and yaw deck 126 provide a yaw orientation system for wind turbine 100. In some configurations, the yaw system is mounted on a flange provided atop tower 104.

Typically, a yaw bearing is mounted to the top section of the tower. A bedplate supporting the weight of the power train rotates on the yaw bearing, allowing wind turbine controls to rotate the nacelle to better position the blades wind respect to the wind direction for optimizing performance. A center access is provided above the topmost landing of the WTT into the nacelle.

The electrical controls for a yaw drive system may include multiple electric drive motors 136. Each electric drive motor 136 may be mounted on a yaw drive 124, which includes an internal gear train connecting the electric drive motor to a pinion gear. FIG. 2 illustrates two yaw drives with view of two additional yaw drives blocked by the main bearing 118 and main shaft 116. The pinion gear of the yaw drive engages the yaw gear, allowing for rotation of the yaw bearing and the nacelle. In certain embodiments, four yaw drives may be provided for the yaw gear. Operation of the electric drive motors 136 and thus positioning of the nacelle and the wind turbine blades relative to the wind is provided by a wind turbine control system.

Failure of one or more yaw drives may prevent the nacelle and hence the wind turbine blades from being correctly positioned with respect to the wind by the wind turbine control system.

A yaw drive may weigh about 1100 lbs, which makes it too heavy for manual movement in the nacelle and also an overload for the light-load installed permanent tower winch that are available in some wind towers. Conventional practice is to remove a yaw drive through a top hatch 139 of the nacelle 102 or through a larger opening, a nacelle lid 140, depending on the size of the yaw drive. The lift may be performed by a large site crane, capable of reaching above the top of the wind turbine tower from the ground. Use of the site crane is expensive and results in delays with crane availability. An alternate practice is to provide a crane (not shown) that may be mounted within the nacelle 102, but which extends outside a top of the nacelle and is capable of lifting the yaw drive. An access port 141 on top of the nacelle is opened to allow the erection of the crane. The hatch 139 on top of the nacelle is opened to provide a lifting path for removal of the yaw drive. A second crane may be required within the nacelle to lift the yaw drive off its foundation and move to a location for a vertical lift through the hatch 139. Once the yaw drive has cleared the top of the nacelle, the crane arm may move the yaw drive outside the envelope of the wind tower and lower the yaw drive to the ground.

Lifting operations for equipment from the nacelle and external to the tower expose the operators and the equipment inside the nacelle to environmental conditions. High winds make these external lifts dangerous for personnel and for equipment. Safety requirements strictly limit wind velocity allowable during the outside lifts. Since windfarms are generally selected based on availability of wind for driving the blades, significant delays can be encountered while waiting for acceptable conditions. Such delays result in a waste of manpower and lost operating time for the wind turbine resulting in added expense and loss of electrical power revenues.

Accordingly, there is a need to provide a safe, simple, timely, and cost-effective method for replacing articles of wind turbine equipment in the nacelle.

BRIEF DESCRIPTION OF THE INVENTION

The present invention relates to a method for removing an article of wind turbine equipment from a nacelle of a wind turbine tower (WTT), such as a drive or a yaw drive, through an internal path in the WTT. Briefly in accordance with one aspect of the present invention, a method is provided for removing an article of wind turbine equipment from a nacelle wind turbine tower (WTT). The method includes installing a load-rated winch internal to the wind turbine tower, adapted to lowering and raising the article between a base of the WTT and the nacelle of the WTT. The method also installs an internal support crane within the nacelle, adapted to transferring the article from its mounting to the load-rated winch. The article is disassembled from its foundation. The method translates the article from its foundation to the load-rated winch internal to the WTT with the internal support crane. Once the load-rated winch supports the article, the article is lowered to the base of the wind WTT.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including removing and replacing one or more articles of equipment from the nacelle through an internal path within the WTT. Use of an internal path avoids the need to breach the nacelle and lift articles of wind turbine equipment from the nacelle external to the wind turbine tower at extremely elevated heights. With internal movement of articles of wind turbine equipment such as a yaw drive, the danger of the elevated heights and extreme environmental conditions may be avoided. Delays encountered in external lifts associated with high winds and other environmental conditions that result in loss of productivity and prolonged outage of the electric power production may also be avoided.

Figure 1:
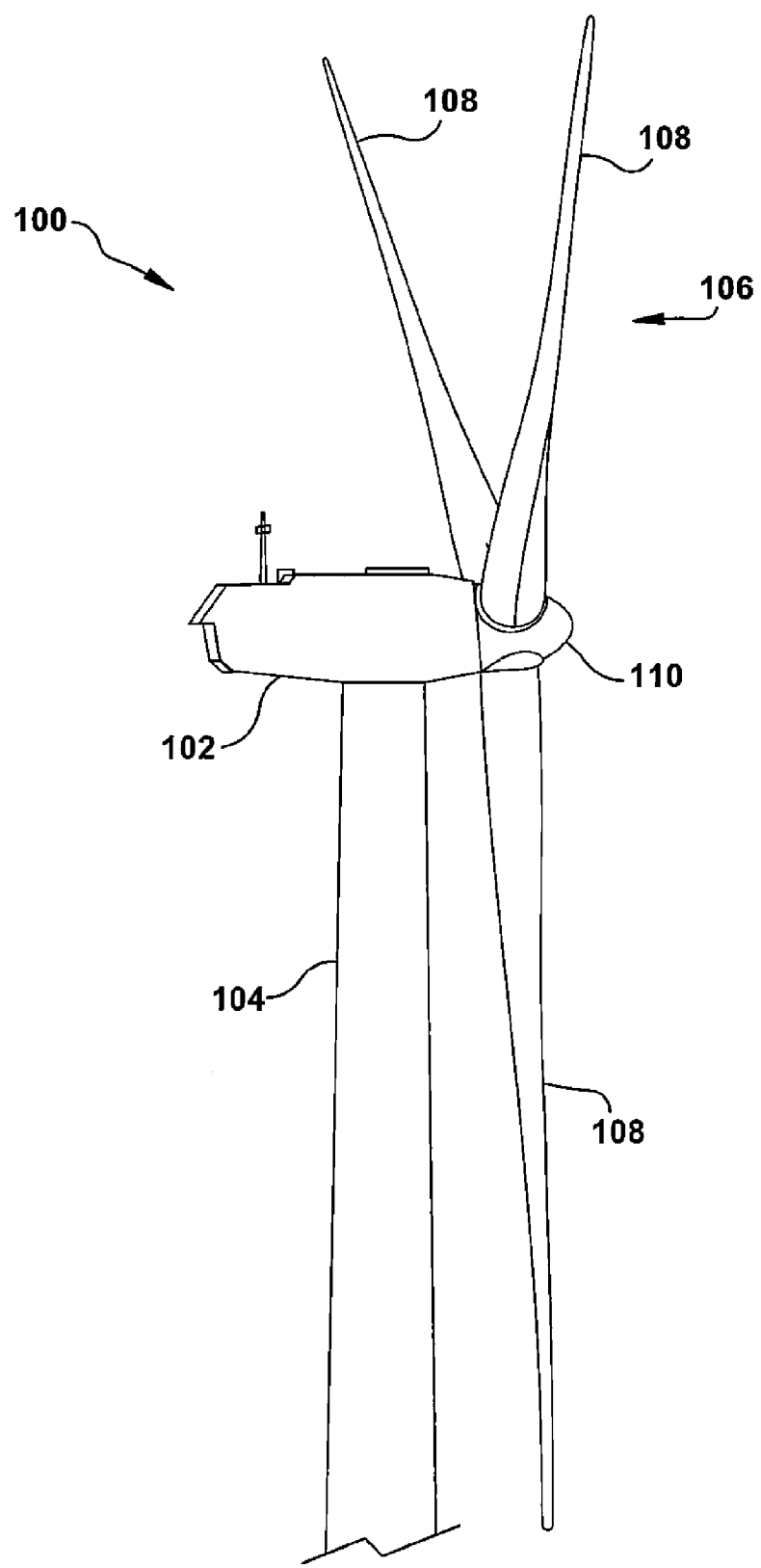
FIG. 1 illustrates an exemplary wind turbine tower.
Figure 2:
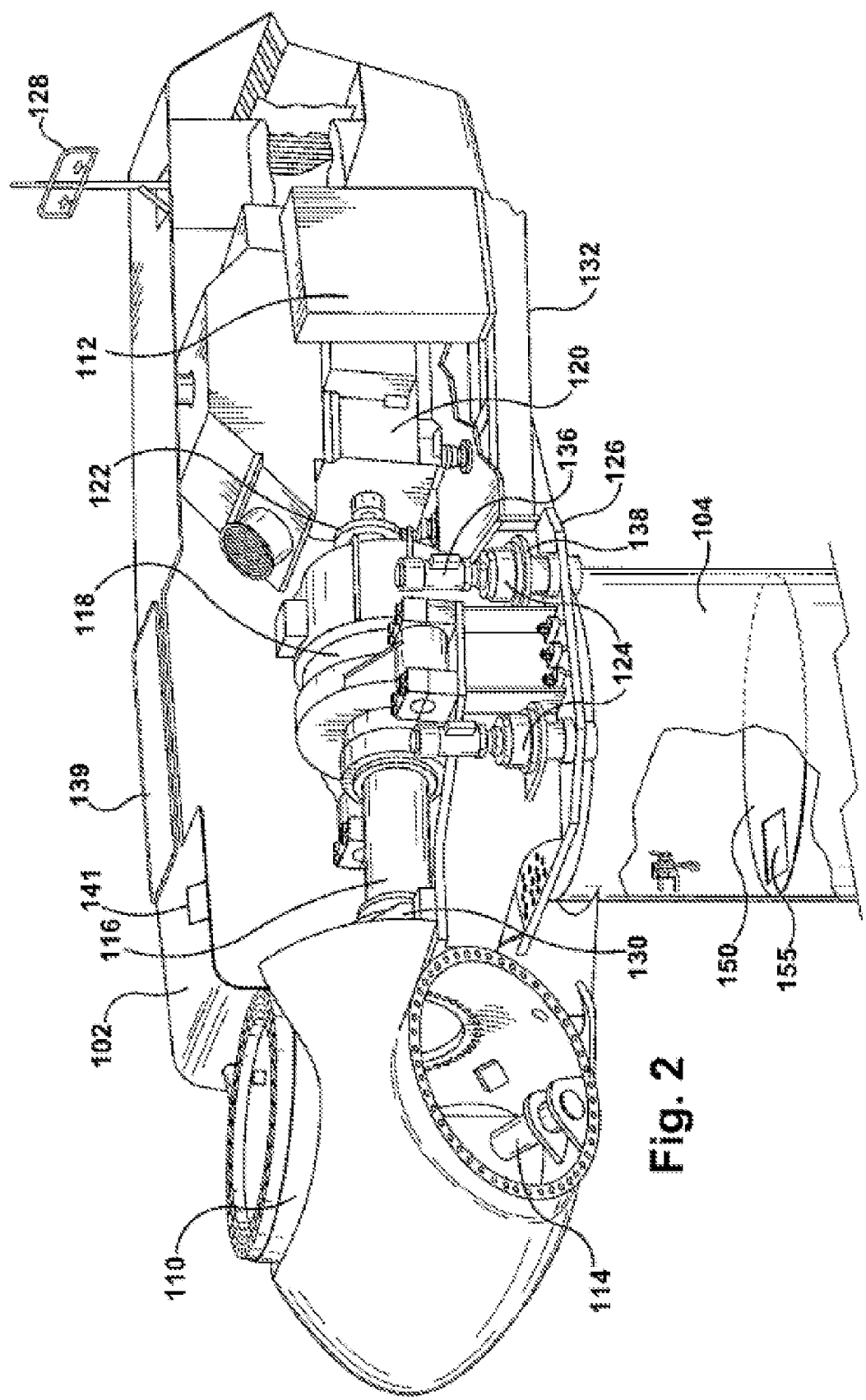
FIG. 2 illustrates an exemplary arrangement of components within a nacelle for a wind turbine tower.
Figure 3:
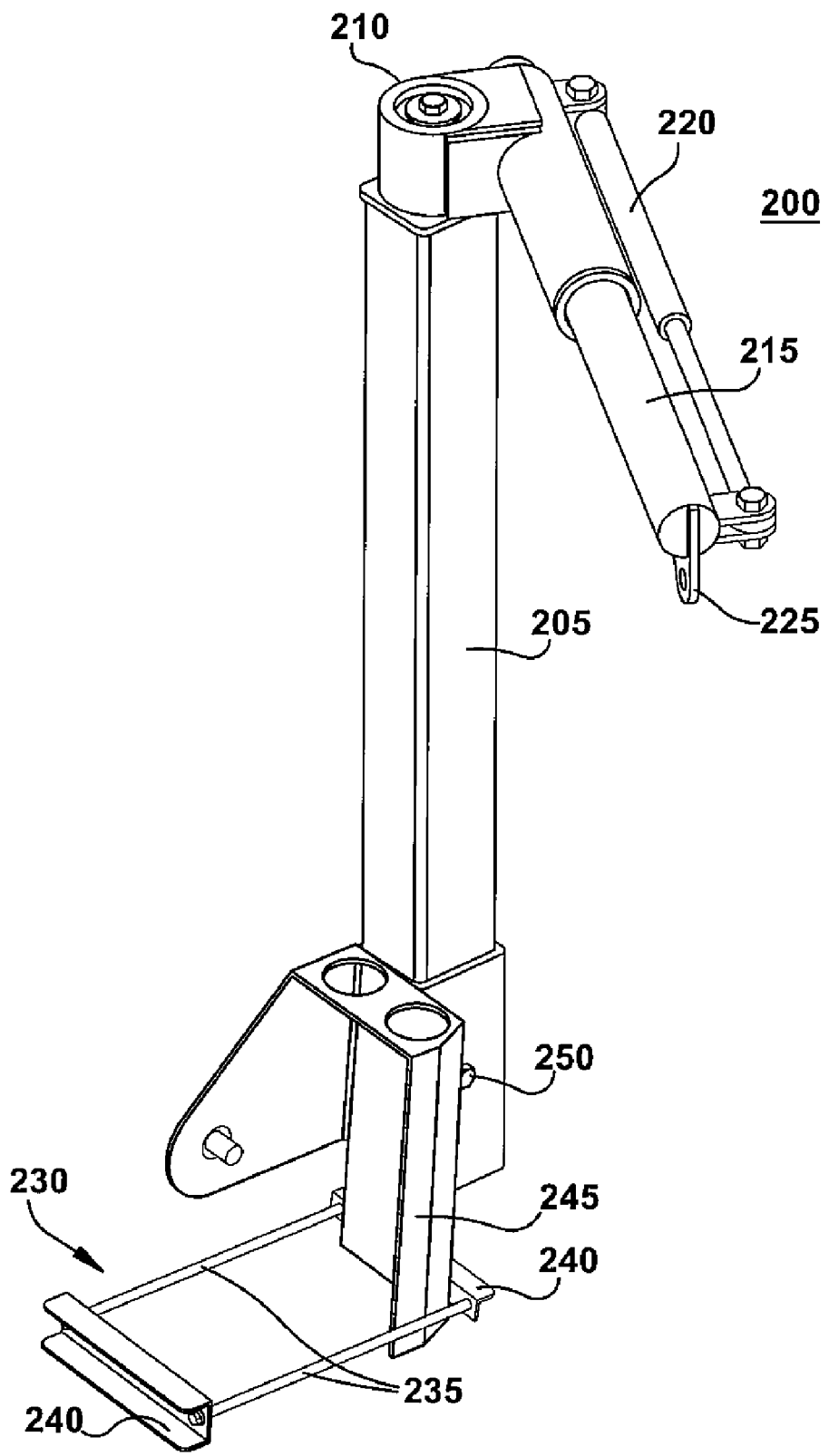
FIG. 3 illustrates an exemplary support crane arrangement.

FIG. 3 illustrates an exemplary support crane arrangement. The support crane may include other suitable configurations and mountings. The support crane 200 may include a vertical pillar 205, a pivot assembly 210, a jib arm 215, a hydraulic cylinder 220, an end clasp 225 and a mounting fixture 230. The pivot assembly 210 permits rotation of the jib arm 215 about the pillar 205. The hydraulic cylinder 220 allows extension and retraction of the jib arm 215. The combined rotation and extension of the jib arm 215 allows access to a wide range of locations about its point of mounting. The mounting fixture 230 may include counterplates 240, connected by thread bars 230. The pillar 205 is mounted and locked with locking pin 230 into base frame 240. The mounting fixture 230 engages with receiving mounts 340 (FIG. 4) within the nacelle in proximity to the yaw drives. The support crane may be mounted in proximity to the yaw drive. The support crane may be utilized to lift the drive motor off the yaw drive and then to lift and translate the yaw drive close in proximity to a winch sized for the load (load-rated winch), which may be a heavy-duty winch.

Figure 4:
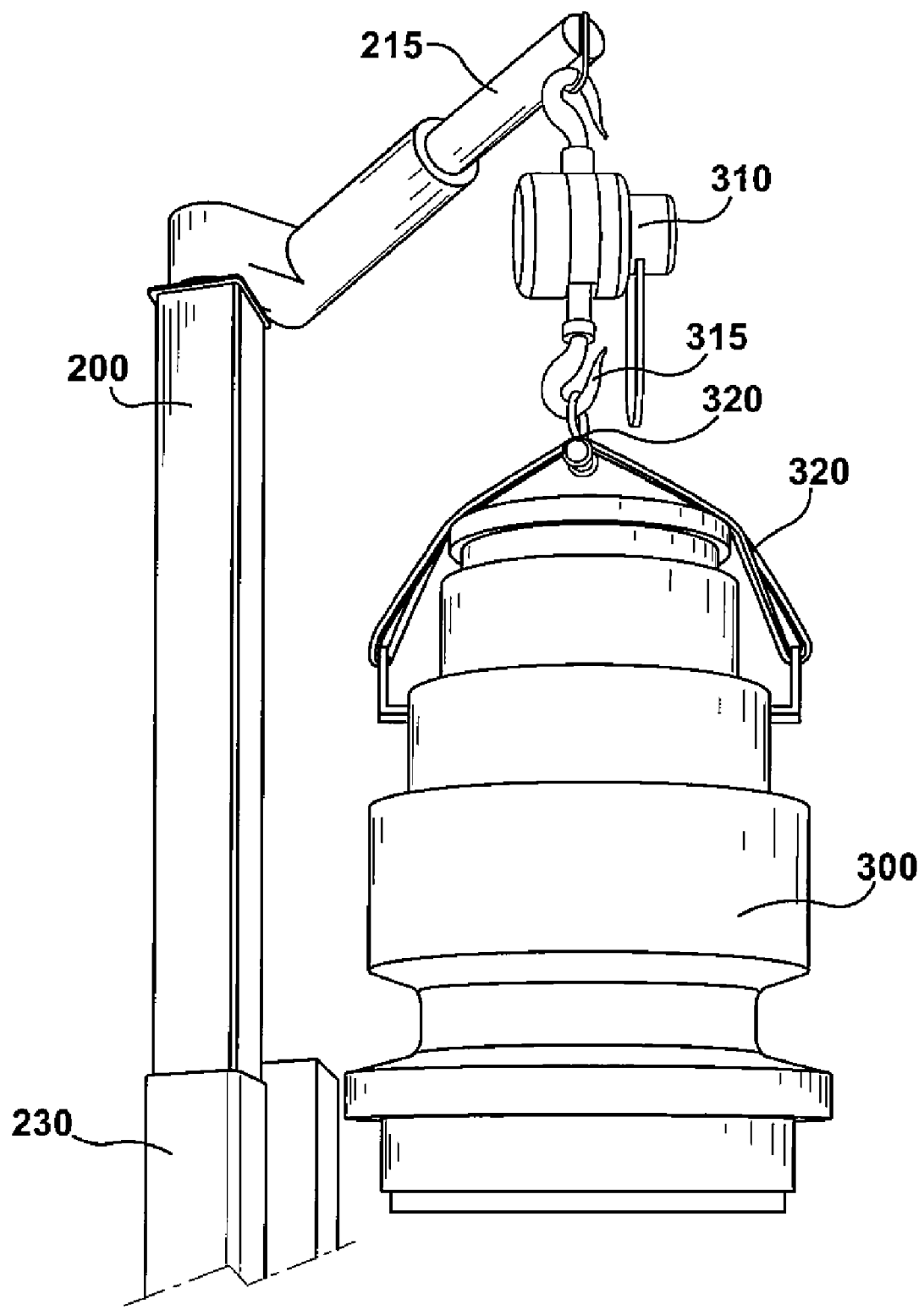
FIG. 4 illustrates the support crane lifting the yaw drive.

FIG. 4 illustrates the internal support crane lifting the yaw drive. The support crane 200 is erected on receiving mount 340 in proximity to the yaw drive 300. The end clasp 225 of the jib arm 215 may be rigged with a chain fall 310 and hook 315. The yaw drive 300 may be rigged with a sling 320 and two shackles 325 (second shackle not shown). The jib arm 215 positions chain fall 310 and hook 315 over the top of the yaw drive 300. The hook 315 is attached to one shackle 325 of the yaw drive. Using the chainfall 310, the yaw drive 300 after unbolting, may be lifted up from its foundation. The jib arm 215 may then be rotated and extended to translate the yaw drive 300 and the chainfall 310 may be let out to lower the yaw drive 300 in proximity to a hook (not shown) from the load-rated winch. The hook of the load-rated winch (FIG. 5) may be engaged with second shackle of the sling 320 for the yaw drive 300. The engagement of the hook from the load-rated winch and the sling 320 on the yaw drive 300 will take place below the main shaft 116 and above the top deck of the WTT. In the customary rigging fashion, the yaw drive load will be transferred from the hook of the chainfall 310 to the hook of the load-rated winch (FIG. 5).

Figure 5:
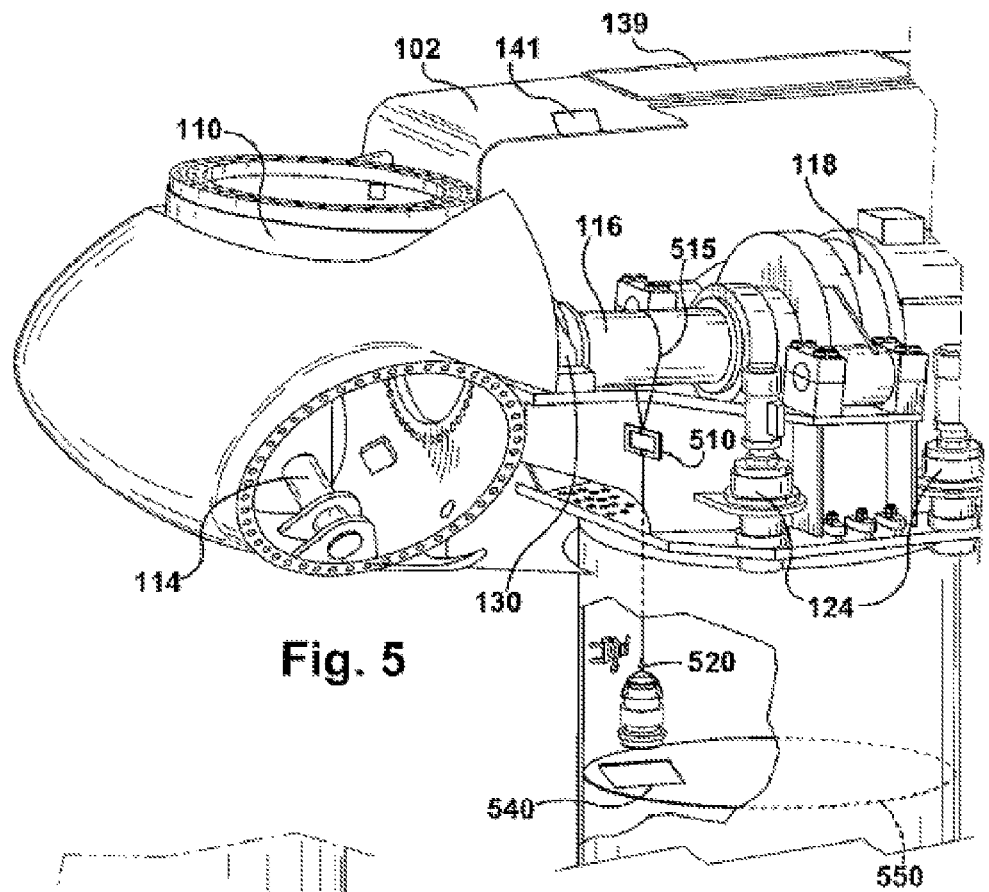
FIG. 5 illustrates the yaw drive being lowered by the load-rated winch.

FIG. 5 illustrates the yaw drive being lowered by the load-rated winch. The load-rated winch 510 may be attached with a lifting strap 515 to a main shaft 116 of the wind turbine. Alternatively, the load-rated winch 510 may be supported by lifting pads or other appropriate supports within the nacelle 102. The load-rated winch may be powered from a local electric power supply within the WTT. A chain hook 520 on the load-rated winch 510 attaches to the shackle 330 of the sling 320 for the yaw drive 300. The yaw drive 300 is lowered through the landing hatch 540 of the top deck 550 and through the landing hatches of the other decks (not shown) within the WTT until the base is reached.

Figure 6:
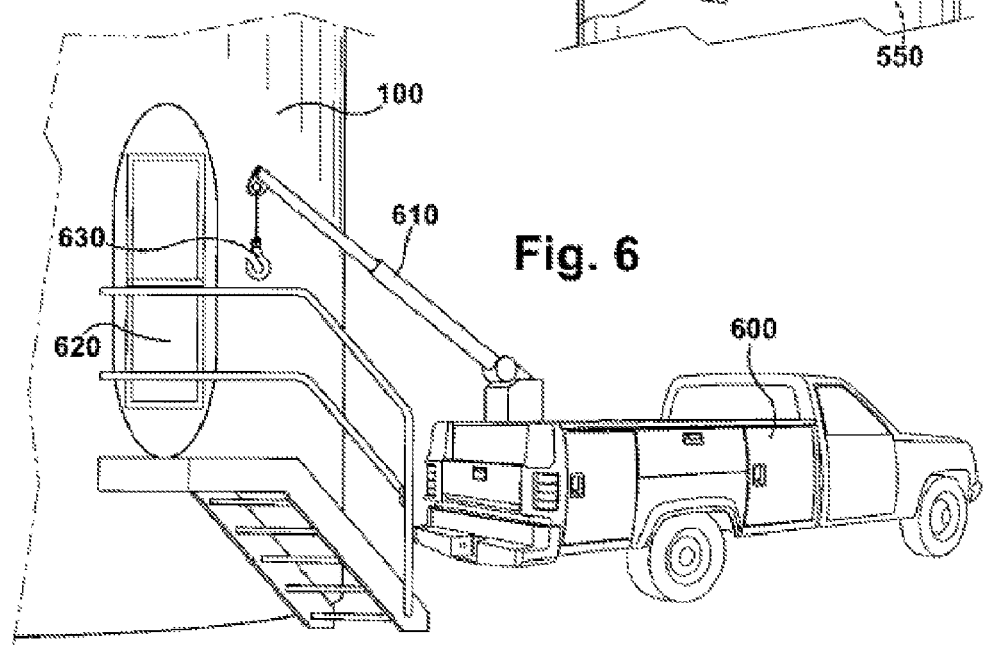
FIG. 6 illustrates the yaw drive being removed through a door at the base of the wind turbine tower.

FIG. 6 illustrates the yaw drive being removed through a door at the base of the wind turbine tower. A truck 600 with a boom 610 may be positioned in proximity to a tower door 620 of the wind turbine tower. The tower door 620 is opened and the boom 610 may extend to engage the yaw drive 300 with a hook 630. Alternatively, a fork truck or similar device may be used to remove the yaw drive from the base of the tower.

The method of removal of the yaw drive from the WTT may be reversed to hoist the a replacement yaw drive up the tower, translate the yaw drive to its foundation and mount the yaw on its foundation within the nacelle.

Figure 7:
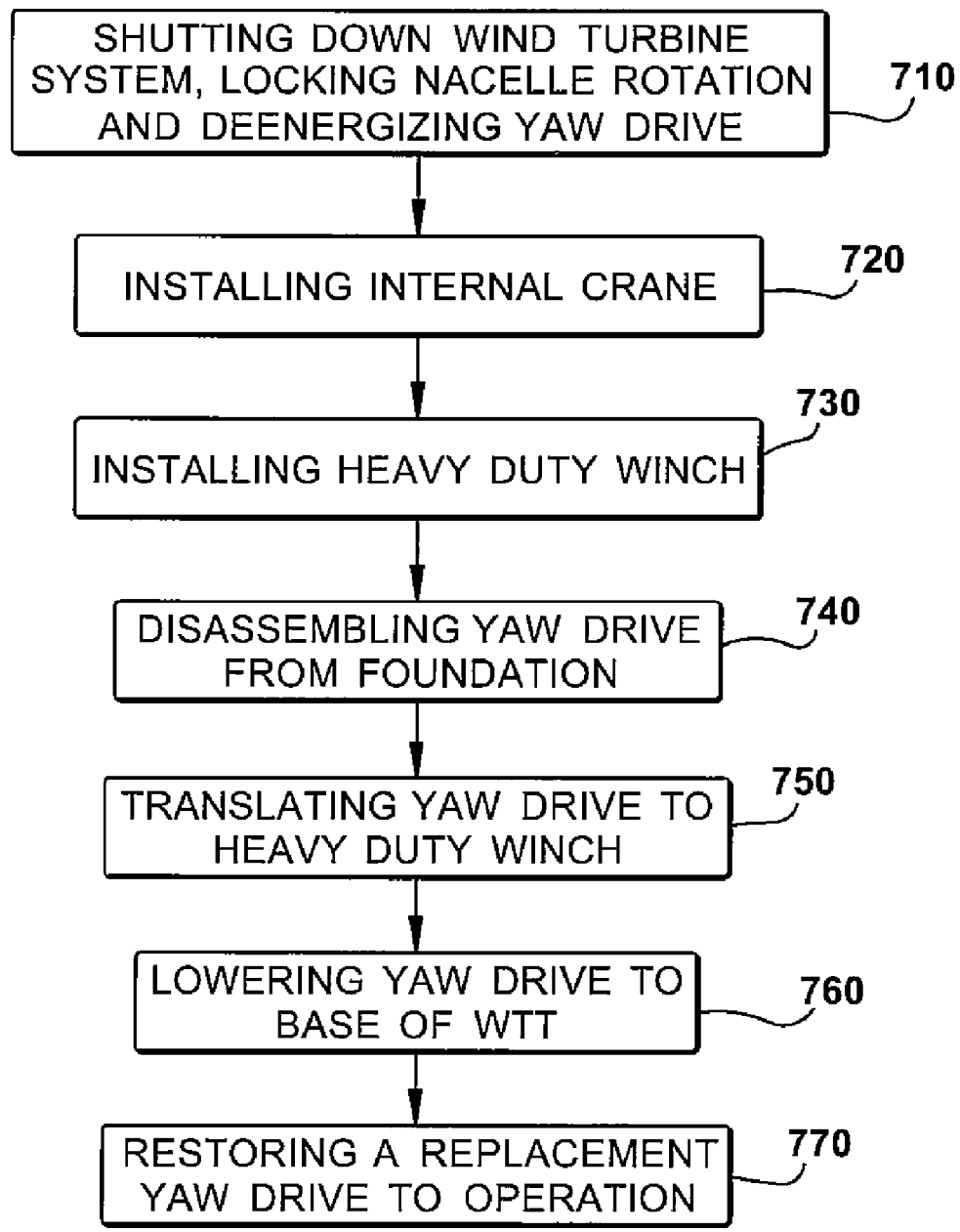
FIG. 7 illustrates a flow chart for the procedure for removing a yaw drive from a wind turbine tower through an internal path.

FIG. 7 illustrates a flow chart for an embodiment of a procedure for removing an article of wind turbine equipment from the nacelle of the WTT through an internal path. In this exemplary embodiment, the article of wind turbine equipment is a yaw drive.

In a first step 710 the wind tower is prepared for the removal of the yaw drive by shutting down the wind turbine system, locking the nacelle from rotation and deenergizing the yaw drive. Deenergizing may also require removing power from any interferences that need to be removed during the procedure.

In step 720, an internal support crane is installed. The internal support crane may be is mounted in proximity to the yaw drive. Step 730 includes installing a load-rated winch internal to the WTT where the load-rated winch is adapted to lowering and hoisting the yaw drive between the nacelle and the base of the WTT. Installing the load-rated winch may include lifting the load-rated winch up the WTT with a permanent tower winch. The load-rated winch may be shifted to a mounting position by transferring the load-rated crane to the internal support crane with a come-along. Once carried by the internal support crane, the load-rated winch may be positioned under the main shaft. The load-rated winch may then be mounted to the main shaft with a lifting strap. Alternatively, the load-rated winch may be mounted to other convenient locations such as lifting pads or mounts.

Step 740 includes disassembling the yaw drive from its foundation. Interferences may be removed such as catwalks and other components restricting the disassembly of the yaw drive. The electric motor may be removed from the yaw drive if useful in moving the yaw drive. Scribe marks are made on the foundation to indicate the orientation of the yaw drive with respect to the foundation for use in the subsequent replacement of the yaw drive. The yaw drive is disconnected from the foundation by unbolting. The yaw drive is removed from the foundation using lift provided by a chain fall on the internal support crane.

In step 750, the yaw drive is translated from its foundation to the load-rated winch. Interferences may be removed to facilitate transfer of the yaw drive to the internal crane. The yaw drive is lifted with the chain fall, swung by the jib arm around the pivot assembly, and lowered with the chain fall to move the yaw drive around various obstructions and down under the main shaft, in proximity to the hook of the load-rated winch. The hook of the load-rated winch may be attached to a second shackle on the yaw drive sling. Then the yaw drive load may be shifted to the load-rated winch. Step 760 includes lowering the yaw drive to the base for removal from the WTT. Once at the base, the yaw drive may be removed through the tower door using a truck hoist, winch or forklift.

In step 770, a replacement yaw drive is restored to operation, which may include hoisting a replacement yaw drive to above the top deck with the load-rated winch. The internal support crane is positioned in proximity to the yaw drive and the replacement yaw drive is transferred to the support crane. The support crane translates the replacement yaw drive to a position above its mounting. The replacement yaw drive is lowered with the chain fall onto its foundation, orienting the replacement yaw drive in accordance with the marking before removal. The yaw drive is bolted in place. The electric drive motor is restored, if previously removed. Removed interferences are restored. The load-rated winch is removed and the tower winch is replaced. The internal support crane is removed. The replacement yaw drive is operationally tested and the wind turbine tower and wind control system are restored to operating condition.

While various embodiments are described herein, it will be appreciated from the specification that various combinations of elements, variations or improvements therein may be made, and are within the scope of the invention.

The invention claimed is:

1. A method for removing an article of wind turbine equipment from a nacelle of a wind turbine tower (WTT), the method comprising:
    installing a load-rated winch internal to the wind turbine tower, adapted to lowering and raising the article between a base of the WTT and the nacelle of the WTT such that lowering and raising occur internal to the WTT;
    installing an internal support crane within the nacelle, the crane adapted for lifting the article from the foundation and transferring the article to the load-rated winch;
    disassembling the article from the foundation;
    translating the article from the foundation to the load-rated winch; and
    lowering the article through the interior of the WTT to the base of the WTT with the load-rated winch.

2. The method for removing an article of wind turbine equipment from a nacelle of a WTT according to claim 1, further comprising:
    raising a replacement article with the load-rated winch from the base of the WTT to the nacelle of the WTT;
    translating the replacement article from the load-rated winch internal to the WTT to the internal support crane within the WTT;
    positioning the replacement article on its mounting with the internal support crane within the WTT; and
    assembling the replacement article.

3. The method for removing an article of wind turbine equipment from a nacelle of a WTT according to claim 1, wherein the article comprises: a wind turbine drive.

4. The method for removing an article of wind turbine equipment from a nacelle of a WTT according to claim 3, wherein the wind turbine drive comprises: a yaw drive.

5. The method for removing an article of wind turbine equipment from a nacelle of a WTT according to claim 4, the step of installing load-rated winch internal to the WTT comprising:
    positioning the load-rated winch in the base of the WTT to be lifted by a permanent tower winch from the base to the nacelle;
    lifting the load-rated winch to the nacelle with the permanent tower winch;
    transferring the load-rated winch to a mounting position above platform openings of the WTT for lowering of the yaw drive; and
    mounting the load-rated winch in the mounting position above platform openings of the WTT, using an internal structure of the WTT.

6. The method for removing an article of wind turbine equipment from a nacelle of a WTT according to claim 5, the step of transferring the load-rated winch to a mounting position comprising:
    attaching a come-along winch mounted on at least one of the internal support crane within the nacelle and a lifting pad internal to the tower; and
    transferring the load-rated winch to the mounting location with the come-along winch.

7. The method for removing an article of wind turbine equipment from a nacelle of a WTT according to claim 6, the step of mounting the load-rated winch comprising strapping the load-rated winch to a main shaft of a power train of the WTT.

8. The method for removing an article of wind turbine equipment from a nacelle of a WTT according to claim 7, the step of mounting the load-rated winch comprising:
    attaching the load-rated winch to mounting pads in an area of the nacelle.

9. The method for removing an article of wind turbine equipment from a nacelle of a WTT according to claim 4, the step of disassembling the article from its mounting; comprising:
    removing an electric drive motor from the yaw drive if required for translation of the yaw drive to the load-rated winch.

10. The method for removing article of wind turbine equipment from a nacelle of a WTT according to claim 4, the step of disassembling the article from its foundation; comprising:
    marking the orientation of the yaw drive being removed on the foundation;
    unbolting the yaw drive from the foundation; and
    separating a yaw drive joint free from the foundation.

11. The method for removing an article of wind turbine equipment from a nacelle of a WTT according to claim 4, the step of translating the article from a foundation to the load-rated winch comprising:
    removing interferences to translation of the yaw drive between the foundation and the load-rated winch.

12. The method for removing an article of wind turbine equipment from a nacelle of a WTT according to claim 11, the step removing interferences comprising:

removing at least one of a nacelle ladder, a catwalk adjacent to the yaw drive, and the permanent tower winch.

13. The method for removing an article of wind turbine equipment from a nacelle of a WTT according to claim 4, the step of translating the article from a foundation to the load-rated winch comprising:
   attaching a chain fall from the internal support crane to the yaw drive;
   raising the yaw drive off a foundation with the chain fall;
   translating the yaw drive to the load-rated winch; and
   transferring the yaw drive to the load-rated winch.

14. The method for removing an article of wind turbine equipment from a nacelle of a WTT according to claim 13, the step of transferring the yaw drive to the load-rated winch comprising;
   supporting the yaw drive to the chain fall with a first shackle;
   providing a second shackle on the yaw drive;
   attaching the winch to the second shackle on the yaw drive;
   shifting the load of the yaw drive to the winch; and
   removing the first shackle from the yaw drive.

15. The method for removing an article of wind turbine equipment from a nacelle of a WTT according to claim 4, further comprising:
   removing the yaw drive from the base of the WTT through a WTT door with one of a truck boom, a truck winch and a fork lift.

16. The method for removing an article of wind turbine equipment from a nacelle of a WTT according to claim 4, further comprising:
   shutting down a wind turbine system;
   locking the nacelle from rotation; and
   deenergizing power to components of the yaw drive.

* * * * *